(12) United States Patent
Landolt et al.

(10) Patent No.: US 10,836,589 B2
(45) Date of Patent: Nov. 17, 2020

(54) SEPARATING ELEMENT FOR THE OPERATION OF A TRANSPORT DEVICE

(71) Applicant: Mueller Martini Holding AG, Hergiswil (CH)

(72) Inventors: Michael Landolt, Reiden (CH); Peter Braschoss, Zofingen (CH)

(73) Assignee: Mueller Martini Holding AG, Hergiswil (CH)

( * ) Notice: Subject to any disclaimer, the term of this patent is extended or adjusted under 35 U.S.C. 154(b) by 70 days.

(21) Appl. No.: 16/197,410

(22) Filed: Nov. 21, 2018

(65) Prior Publication Data

US 2019/0161288 A1 May 30, 2019

(30) Foreign Application Priority Data

Nov. 28, 2017 (CH) ..................................... 1445/17

(51) Int. Cl.
*B65G 47/88* (2006.01)
*B65H 31/30* (2006.01)
(Continued)

(52) U.S. Cl.
CPC .............. *B65G 47/88* (2013.01); *B42C 19/08* (2013.01); *B65G 47/841* (2013.01); *B65G 57/03* (2013.01); *B65G 57/32* (2013.01); *B65H 31/3081* (2013.01); *B65G 2201/0288* (2013.01); *B65H 2301/42266* (2013.01); *B65H 2801/48* (2013.01)

(58) Field of Classification Search
CPC .... B65G 47/841; B65G 47/845; B65G 47/88; B65G 57/03; B65G 57/08; B65G 57/32; B65G 2201/0288; B65H 5/006; B65H 31/3081; B65H 2301/42266; B65H 2404/232; B65H 2801/48; B42C 19/08
See application file for complete search history.

(56) References Cited

U.S. PATENT DOCUMENTS 3,701,176 A 10/1972 Procter et al.
3,718,939 A 3/1973 Mebus
(Continued)

FOREIGN PATENT DOCUMENTS

CH 545738 A 2/1974
DE 2231955 A1 2/1973

*Primary Examiner* — Gene O Crawford
*Assistant Examiner* — Keith R Campbell
(74) *Attorney, Agent, or Firm* — Leydig, Voit & Mayer, Ltd.

(57) ABSTRACT

A separating element operates a transport device, which is configured to pile a plurality of partial book blocks for forming a book block along a book channel associated with the transport device, the finished piled book block being feedible to a processing machine. The book channel includes at least one transfer portion. At least one first separating element is arranged within the transport device as a link between an upstream transfer portion and a downstream transfer portion. The first separating element is configured to be operated by at least one drive and is configured to: receive a partial book block fed horizontally from the upstream transfer portion, horizontally transport the partial book block onward via the conveying portion formed by the first separating element, and then horizontally hand the partial book block over to the downstream transfer portion in keeping with a cycle.

22 Claims, 4 Drawing Sheets

(51) Int. Cl.
*B65G 57/03* (2006.01)
*B42C 19/08* (2006.01)
*B65G 47/84* (2006.01)
*B65G 57/32* (2006.01)

(56) References Cited

U.S. PATENT DOCUMENTS

| | | | | |
|---|---|---|---|---|
| 6,106,219 | A * | 8/2000 | Newsome | B65H 29/26 198/468.1 |
| 7,367,442 | B2 * | 5/2008 | von Freden | B42C 19/08 198/406 |
| 8,070,149 | B2 * | 12/2011 | Schober | B65H 39/043 270/52.14 |
| 8,915,349 | B2 * | 12/2014 | Tas | B65G 29/02 198/377.03 |
| 2008/0315510 | A1 | 12/2008 | Brzinski et al. | |
| 2013/0064626 | A1 * | 3/2013 | Buntemeyer | B65H 31/3018 412/1 |

* cited by examiner

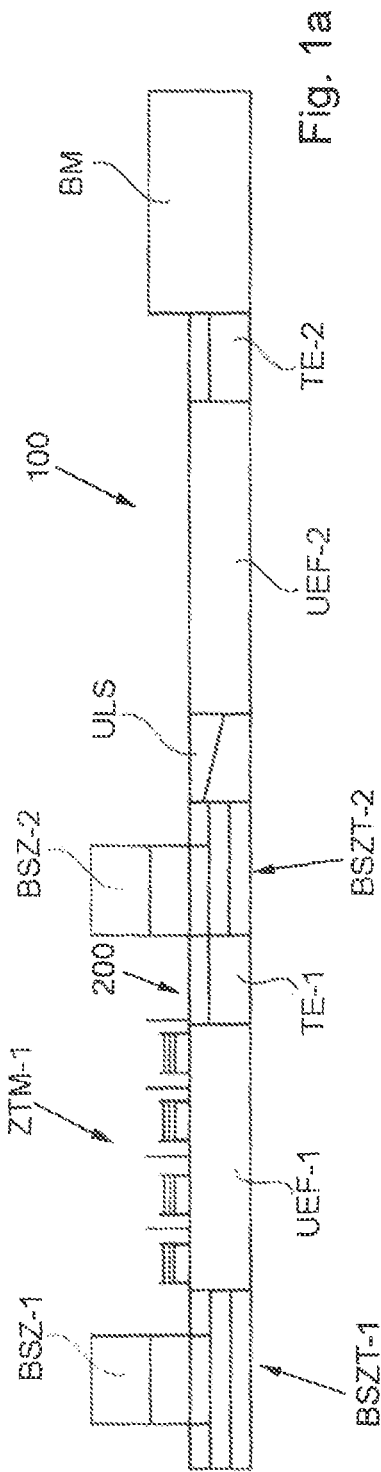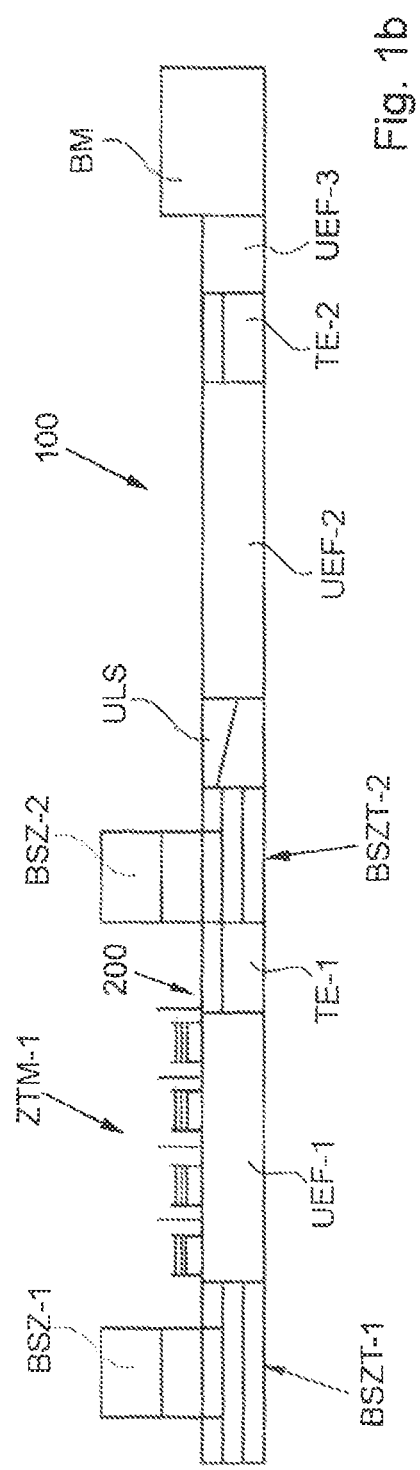

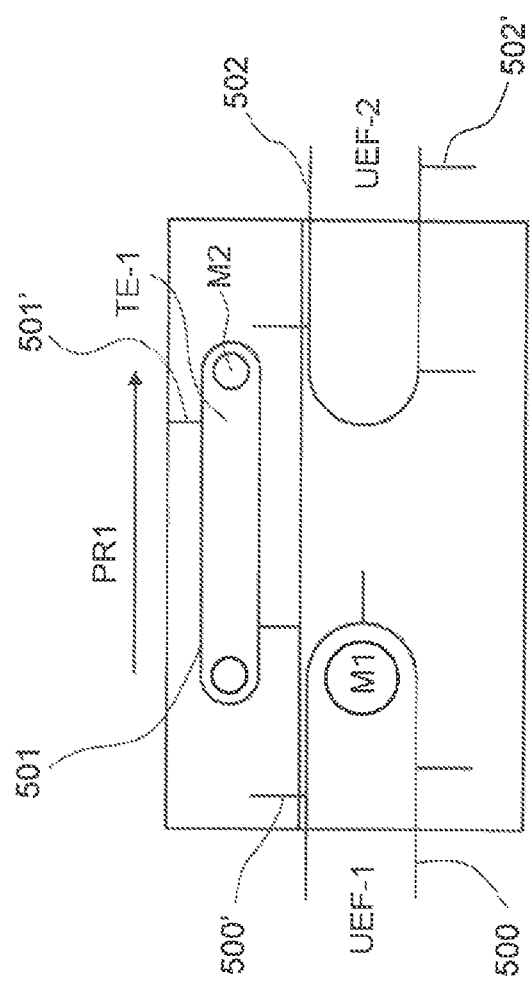

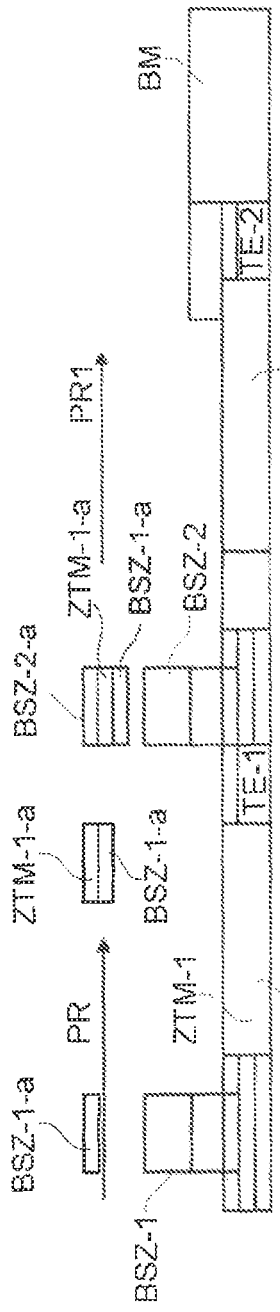
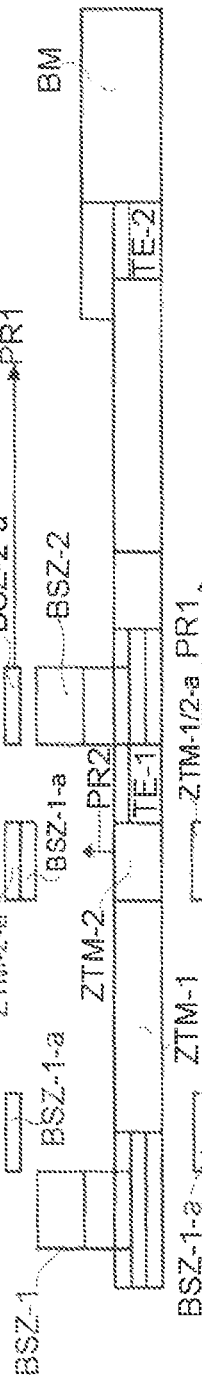
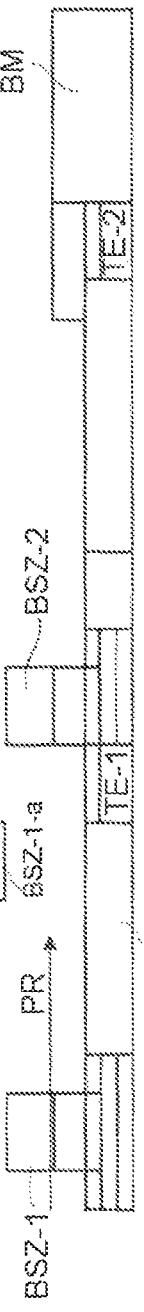
Fig. 3
Fig. 4
Fig. 5
Fig. 6
Fig. 7

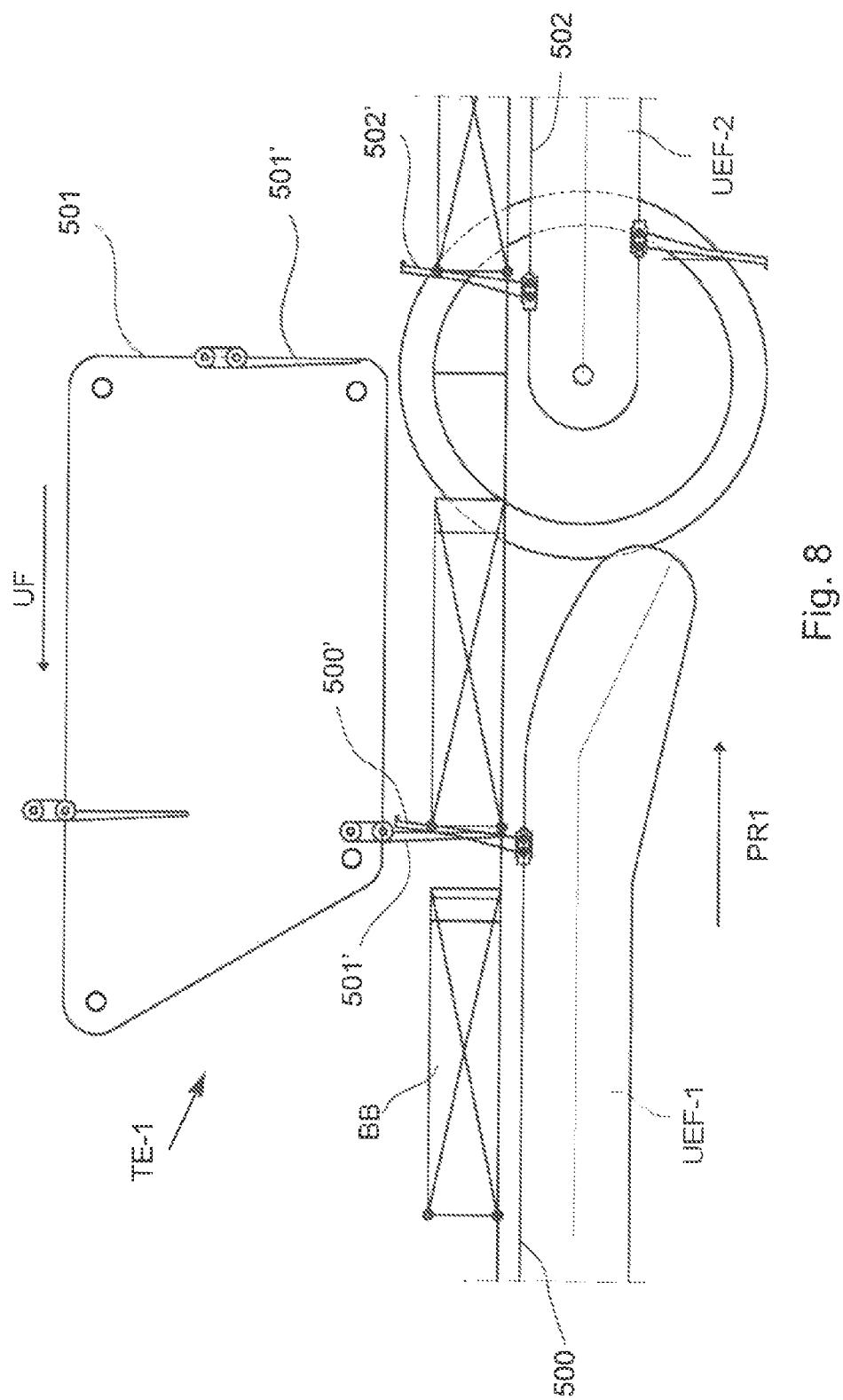

US 10,836,589 B2

SEPARATING ELEMENT FOR THE OPERATION OF A TRANSPORT DEVICE

CROSS-REFERENCE TO PRIOR APPLICATIONS

Priority is claimed to Swiss Patent Application No. CH 01445/17, filed on Nov. 28, 2017, the entire disclosure of which is hereby incorporated by reference herein.

FIELD

The invention relates to a separating element for the operation of a transport device.

BACKGROUND

CH545738 discloses an apparatus which is intended for collating, conveying and binding articles and which is responsible for storing the articles delivered from the first conveying member and passing the articles onto the second conveying member in a particular temporal ratio, the storage apparatus being provided with a gearbox that contains a first means for driving the gearbox by means of the first motor and a second means for driving by means of the second motor, and it being possible to selectively drive the storage apparatus by means of the first or the second motor. Furthermore, the apparatus also relates to a method for operating the apparatus, signatures being fed to the collating machine until an error arises, and the collating machine then being stopped to correct the error, while signatures stored in the collating machine continue to be fed to the transfer conveyor chain until all stored signatures have been fed to the binding machine. The feed is stopped by the transfer conveyor chain, while the binding machine is left running such that the transfer conveyor chain starts up in synchrony with the stopped collating machine to then feed the signatures from the collating machine to the transfer conveyor chain while the two are brought to the intended speeds. Synchronized operation is established between the collating machine, the transfer conveyor chain and the binding machine before the signatures passed onto the transfer conveyor chain are fed to the binding machine.

DE2231955 discloses a transfer or transport system for transferring signatures from a printing press to a binder and in particular a synchronously operating system consisting of a printing press and a binder in which the press is operated continuously, both while the binder is being re-started and while it is operated in synchrony with the press. This document also discloses that a transfer system is provided that is suitable for feeding gathered or collated signatures from a continuously operating printing press to a synchronously operating binder. The transfer system for transferring the signatures is provided with synchronizing means which operate the printing press, the binder and the transfer conveyors in synchrony, and which are provided with a diversion apparatus to divert the signatures from the conveying apparatus if the binder is stopped. The transfer system also includes an apparatus that automatically synchronizes the binder with the system when the binder is started up again. This document also discloses a method for transferring collated signatures from a signature-collating press to a binder.

SUMMARY

An embodiment of the present invention provides a separating element for operation of a transport device, which is configured to pile a plurality of partial book blocks for forming a book block along a book channel associated with the transport device, the finished piled book block being feedible to a processing machine. The book channel comprises at least one transfer portion. At least one first separating element is arranged within the transport device as a link between an upstream transfer portion and a downstream transfer portion. The first separating element is configured to be operated by at least one drive and is configured to: receive a partial book block fed horizontally from the upstream transfer portion, horizontally transport the partial book block onward via the conveying portion formed by the separating element, and then horizontally hand the partial book block over to the downstream transfer portion in keeping with a cycle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1a shows a transport device including the typical elements;

FIG. 1b shows a further transport device including the typical elements;

FIG. 2 is a theoretical depiction of the structure of a first separating element;

FIGS. 3-7 show variants of embodiments of the present invention; and

FIG. 8 shows the kinematic process within a separating element.

DETAILED DESCRIPTION

The invention relates to at least one first separating element within a transport device, the separating element conveying the piled partial book blocks onward, which partial book blocks lie horizontally one above the other. In addition, the invention also relates to at least one second separating element that is arranged downstream of the first separating element along the same transport device, and transports the finished piled partial book blocks onward, lying on the spines thereof, to a downstream processing machine.

An embodiment of the invention provides a separating element, also referred to as a handover element, which is provided with transfer means and can detect and onwardly convey the partial book blocks or book block products in general irrespective of the specified position of the partial book blocks or book block products, which are fed via an upstream transfer portion, and then hand them over to a downstream transfer portion in keeping with the cycle, the transfer portions being operated in a segmented manner in relation to one another; this leads to advantageous operational autonomy.

Introduced one after the other, the loose partial book blocks are first introduced, in a form-fitting manner and lying horizontally one above the other, into an also horizontal book channel (horizontal channel); this technique differs in principle from that whereby the book blocks are transported, along a "vertical channel", i.e. lying on the book spines, throughout. In principle, the book channel is formed by a series of preferably successive transfer portions. Only at the end is the horizontally transported and finished assembled book block product transferred to another position for the purposes of the adjoining processing machine.

The free-flowing nature of the piling process, i.e. of the cycle synchronization, is based on an incline interdependency between the two units, book channel/sheet pile feed table, such that the sheet pile feed table has a series of band-conveyors that ensure cycle synchronization of the sheet piles, and such that the partial book block is transported in the book channel such that the piling occurs by means of a finger chain that acts interdependently between the sheet pile feed table and the book channel, and thus maintains the conveyance of the particular product.

It is clear that for comprehensive operation in this manner, at least two separating elements are provided that are dynamically operatively connected to the transfer portions, i.e. the particular partial book block is intended to be handed from one transfer portion to the other, in a manner that is not necessarily, but in most cases, discontinuous.

The separating element forms a substantial component for the horizontal transport of the book block products, in the sense that the separating element acts in general as a "bridge", or link, between an upstream transfer portion and a downstream transfer portion in the production direction, it also being possible for the transport device in question, as mentioned, to include a plurality of separating elements.

The separating element, which is driven by a servomotor, makes it possible for the book block products to be handed from a finger chain operating in the first transfer portion, to a finger chain of the second, downstream transfer portion.

In principle, the finger chain of the separating element picks the book block products up as they are transported along an upstream transfer portion; the book block products are then conveyed onward by the finger chain via the transport portion defined by the separating element, and are then handed over to a downstream transfer portion in keeping with the cycle.

By means of the various chain pitch options, the servomotor can run on a plurality of different speed profiles, the servomotor preferably being controlled according to stored control profiles. That being said, there are also control profiles that can adaptively or predictively operate the control of the system within the separating elements.

The partial book blocks are piled one above the other in a form-fitting manner; in addition, the partial book blocks are transported along the book channel truly successively, i.e. the distance between the individual partial book blocks, including when later assembled as finished book block products, in the production direction approaches zero, i.e. in general, the book block products virtually adjoin one another, i.e. format and thickness dependency does not have an influence on the spacing between the book block products in the production direction. This has the significant advantage that adjustment is not necessary when different book block products are produced.

If need be, the control profiles can base the movement profile within the transport unit as a whole on the product format, i.e. in the case of shorter product lengths, for example, it is possible to reduce the intermediate rises in speed in the production direction.

Advantageously, the carrier fingers operating in the separating element are intended to adopt an associated position that is kept within narrow limits, so that aggressive pivoting movement is eliminated when the fingers are used in the surroundings of the book block products.

A further significant advantage of the invention can be considered to be that the horizontally guided book block products within the separating element and upstream and downstream thereof allow a real technological advancement to be made over the disclosed transport devices.

Furthermore, it is not necessary either to make adjustments due to the different formats of the book block products within separating elements of this kind. Accordingly, the drive of the servomotor used in the separating element also makes it possible to omit switching between mechanical ratios for different finger chain pitches.

The aim of the invention is therefore to rely on a plurality of individually designed separating elements which are provided for the operation of a transport device, and which are designed for piling a plurality of partial book blocks for forming a book block, or book block product in general, along a book channel associated with the transport device, such that the finished piled book block can then be fed to a processing machine in accordance with predetermined criteria.

As has already been summarized, the first separating element, which can be operated by means of at least one drive, receives a partial book block fed horizontally from the upstream transfer portion; the partial book block is then horizontally transported onward via the conveying portion formed by the first separating element, and is then horizontally handed over to the downstream transfer portion in keeping with the cycle.

At the same time, a second separating element, arranged downstream together with at least one independent drive, also receives a partial book block, which has already been vertically oriented by the upstream transfer portion; the separating element transports the partial book block onward via the conveying portion formed by the second separating element, and then vertically hands the partial book block over to the downstream transfer portion in keeping with the cycle, the latter transfer portion being connected upstream of the processing machine. These designs therefore serve to emphasize that the transport device contains various separating elements which in principle fulfill the same transfer strategy, but adopt different approaches in terms of how the individual partial book blocks are transported onward.

In particular the separating elements provided for use as a link between two transfer portions have, along the conveying portions thereof for transporting the partial book blocks, an integrally continuous or segmented finger chain, which itself includes carrier fingers that are firstly vertically or virtually vertically oriented for the horizontally guided partial book block. As soon as the horizontally guided book block products are, in general, transferred to a vertically guided position, the maxim holds that the carrier fingers have to be horizontally or virtually horizontally oriented from the starting point of this new position, and this applies in particular to the second or final separating element upstream of the processing machine.

For this purpose, preferably downstream of the operation of a final sheet pile feed unit designed for horizontal feeding, a transition portion is provided within which the book block product fed thereto is transferred from being horizontally transported to being vertically transported. If, downstream of the transition portion, a second or further separating element is arranged, which in some cases acts as a final separating element prior to the processing machine within the described transport device, these same book block products are generally guided vertically via the conveying portion of the separating element.

As a result of this measure, it is possible to keep the transfer portion arranged downstream of the final separating element extremely short, because the book block products are thus already in the position that is predetermined for the processing machine, meaning that no further arrangements need be made in this regard.

As far as the apparatus is concerned, this now makes it clear why the final separating element is characterized by a different orientation of the carrier fingers in comparison with an upstream separating element.

The partial book blocks to be piled or the finished piled book block products can be cyclically conveyed via the first and/or second separating element in a monotonous, synchronous or discontinuous manner with respect to the cycle of the transfer portions arranged upstream and downstream of the separating elements; this clearly conveys that the separating elements in themselves carry out the function of bringing order to a possible discontinuous cycle during the transport of the book block products along the remaining transfer portions of the transport device.

The arrangement of the separating elements within the transport device then fulfill further order-bringing functions in connection with the piling of the partial book blocks: To ensure the transport-dependent order-bringing function of the separating elements, they are arranged within the transport device such that the upstream or downstream transfer portion is fitted with at least one sheet pile feed unit and/or at least one collating machine feeder unit, the order-bringing function of the separating elements coming into fuller force if the partial book blocks to be piled are fed towards a specified transfer portion both vertically and laterally in relation to the production direction of the transport device, i.e. in these cases, the separating elements have to intervene to bring order to any potential imponderables affecting the feed and onward transport of the book block products.

If the particular partial book block to be piled is fed laterally, the control unit intervenes by performing targeted commands to make a height adjustment to the sheet pile feed unit with respect to the ascertained current height of the incoming horizontal partial book block in the transfer portion (see above). During this procedure, cycle-related irregularities may frequently arise, which can be easily "ironed out" by the separating elements.

Furthermore, the separating elements are intended to align the transported book block products within the conveying portion thereof, as required. It is true that in particular the horizontally transported book block products have a stabilizing, position-maintaining incline within the transfer portions, which is defined as being up to 30°, preferably 20°±5°, more preferably up to 10°. However, even with this position-maintaining incline, irregularities may arise that may be linked to rises or dips in the speed of the book block products during transport and pile formation; the separating elements remedy these irregularities such that the book block products are "settled" at least once they have passed through the corresponding separating element, not least because the speed profiles within the separating elements are stable and dissociated from the speeds of the other transport elements of the transport device.

As far as the transport device is concerned, it is pointed out that, while the operation thereof is operatively connected to the described separating elements, the transport device nonetheless has significant elements that are also essential to operation, so that the conditions can be created to allow the book block product to be transferred to an adjoining processing machine in a manner that is positionally accurate and in keeping with the cycle.

The loose partial book blocks, consisting for example of digital print or non-digital print products, provided from a first sheet pile feed unit in the pile travel direction, are guided via an adjoining collating machine feeder unit where additional individual pages or sheets are added. If, following the collating machine feeder unit, piling according to book block specifications is considered to be complete, the book block product is fed to a perfect binder, a thread stitching machine or another processing machine for further processing.

If, however, this piling of partial book blocks is not yet considered to be complete, a further sheet pile feed unit is provided downstream of the collating machine feeder unit, by means of which feed unit further partial book blocks are added to the book block packet, which is loosely formed up to this point.

Where reference is made to loose partial book blocks, it is still possible for an adhesive bonding method to be used to selectively fix parts of the partial book block, at least on the spine and as required, for the purpose of intermediate block formation.

It thus emerges from these summary designs alone that in principle the formation the final book block (book block product), which is formed of various partial book blocks, has to be carried out carefully if the intention is to ensure that the finished piled book block product maintains its piling uniformity on its path towards a downstream processing machine, meaning that it is not necessary to perform any further orientation measures in this respect when the book block is introduced into the downstream processing machine, e.g. a perfect binder, thread stitching machine, etc.

In principle, additional collating machine feeder units and/or sheet pile feed units can be added to the transport device for the horizontal transport of the partial book block or book block products; these additional units are called upon for the book block product in question either integrally or only selectively, i.e. it is possible to simply skip stations of this kind, as required, when forming the book block product.

If a transport device of this kind, designed to horizontally transport the partial book block and intended for forming a final book block, is operated over a plurality of feed stations (sheet pile feed units, collating machine feeder units, etc.), it is necessary to make further provisions that ensure that the operation can run continuously.

Based on the example of a book channel consisting of transfer portions for horizontally transporting the book block products, sheet pile feed units, collating machine feeder units and separating elements are provided in the production direction, which are arranged in a consistent manner or as desired. Typical conveyor continuity may consist in a first collating machine feeder unit, on which a first separating element acts, being arranged downstream of a first sheet pile feed unit. Conveyor continuity further downstream can be repeated according to this positioning, or the sequence may be configured as desired, the feed elements generally being associated, either in isolation or in combination, with an independently operating transfer portion.

In a specific case, this means that, downstream of a first transfer portion that extends over the first sheet pile feed unit and the collating machine feeder unit, a first autonomously and interdependently operable separating element should be provided if the downstream units are intended to be supplied in keeping with the cycle.

Where reference is made to an autonomously and interdependently operable separating element, this is done to emphasize that its distinct function is to convey the partial book blocks, loosely formed up to this point and arranged horizontally, from an upstream transport portion to a downstream transport portion in a continuous and form-fitting manner, but not necessarily in keeping with the cycle of upstream operation.

Meanwhile, the separating element is also able, with regard to the conveyance, to separate the transfer of the book block product from an upstream transport portion to a downstream transport portion, such that the two portions can be operated autonomously.

If the separating element therefore has to fulfill the function of conveying the book block product from an upstream transport portion to a downstream transport portion, provisions have to be made to allow the separating element to run on various speed profiles, depending on the requirement. In this process, it is necessary to consider not only the cycle setting across the various transport portions, but also the product lengths and, if need be, other properties (paper texture, etc.) of the loose partial book blocks.

The infrastructure of the transport device thus consists of a transport path that is typically fitted with the following elements: i) a first transfer portion, which is operatively connected to a first sheet pile feed unit and a first collating machine feeder unit; ii) a first separating element, which is arranged downstream of the first transfer portion; iii) a second transfer portion, which follows the first separating element and is operatively connected to a second sheet pile feed unit; iv) a second separating element, which is arranged downstream of the second transfer portion; v) a third transfer portion, which, by this point, provides the positional infrastructure of the book block for the adjoining processing machine.

Proceeding from a transport path of this kind, which is not considered definitive, the following items and operating modes, which form the invention itself, are indicated:

A continuous operating mode of the transport portion consists in all the mentioned elements operating efficiently and simultaneously. In this operating mode, consistency between the individual partial book blocks does not necessarily have to be uniform, i.e. although all the feed elements contribute to the formation of a finished book block product for a downstream processing machine, the specific input of individual feed elements in the particular finished book block may be vary, or may approach or reach zero on an intermediate basis.

For example, this is the case if not all possible individual pages or sheets are completely run off by the collating machine feeder unit, i.e. those that would be possible in principle.

It is clear that for comprehensive operation in this manner, at least two separating elements are provided that are dynamically operatively connected to the transfer portions, i.e. the particular partial book block is intended to be handed from one transfer portion to the other, in a manner that is not necessarily, but in most cases, discontinuous.

A first deliberately restricted operating mode consists in the first transfer portion, together with its sheet pile feed unit and/or collating machine feeder unit, being bypassed, and only the second sheet pile feed unit being operative, meaning that the first separating element is also inoperative. However, this should not be considered to be absolute; the mentioned elements that are not operative from the outset may be selectively activated on an intermediate basis, as required, when different successive partial book blocks are delivered. It is therefore possible to selectively switch to continuous operation at any time.

Operation is also limited if the first collating machine feeder unit is operative, but the sheet pile feed unit is not. During operation of this kind, the first separating element is fully operative, which ensures that the individual pages or sheets run off from the collating machine feeder unit are also discontinuously received and handed over to the second transfer portion in a manner that is positionally accurate and in keeping with the cycle, where the sheets are then supplemented with the input from the second sheet pile feed unit. It is clear that the activation of the sheet pile feed unit triggers direct kinematic operative effects on the operation of the second separating element, which are described further below.

A virtually continuous operating mode is provided, for example, if the second sheet pile feed unit does not have any input and is therefore temporarily or continuously inoperative. Therefore, the operation of the transfer portion from the first separating element onward, for the downstream feed elements, can be continuously operated in keeping with the cycle, i.e. the second separating element conveys the book blocks towards the third transfer portion, as a transition to the processing machine, in a monotonous, synchronous manner with respect to the cycle specified by the second transfer portion.

A divided transport portion of this kind also has the advantage that partial book blocks can be branched off from the flow path at any time, for example downstream of the first separating element and/or following the input from the collating machine feeder unit. These interventions may be motivated by various settings, for example if the control system intervenes due to detection of a lack of quality and scraps the product in advance, or if the control system actively plans this diversion, for example because the product is to be fed to a different processing machine.

This shows that precisely the described division of the transport device into different transfer portions and feed elements results in a high degree of operational flexibility.

A divided transport device of this kind also has the advantage that customer-specific systems can be offered from the outset, which are advantageous for the customer in that they can be easily expanded at any time, at least using the described elements and units.

A similarly structured transport device of this kind also has the advantage that individual additional book-block-associated feeds do not necessarily have to be provided from the vertical, but may also be provided, just as effectively, to the side in relation to the production direction, provided that specific provisions are made that also build on the prior art.

Accordingly, if feeds of this kind are provided, it merely has to be ensured that the handover planes of the different partial book blocks can be adjusted, height-wise, with respect to the transport plane (book channel) of the transport device by means of corresponding sheet pile feed tables that guide the partial book blocks, and can be made to optimally conform with the incoming partial book block in the book channel. Therefore, it is necessary, firstly, to make arrangements to provide upward or downward height adjustment and, secondly, to take coordinating steps, operationally speaking, to ensure that the handover takes place in keeping with the cycle or in a manner operatively connected to the incoming partial book block in the book channel.

As far as the piling of the horizontal partial book block is concerned, the piling can thus take place on the fly during the handover of a partial book block, i.e. not necessarily in stationary operation.

In general, the height-adjustable sheet pile feed unit has three different operating positions, specifically: i) in a passage mode, the sheet pile feed unit is in the top position; ii) in a loading mode, the sheet pile feed unit is in the bottom position; iii) in an adding mode, the height of the sheet pile feed unit is adjusted to the height of the partial book block. It is arranged here for the particular partial book block to be piled to be fed from the sheet pile feed unit and/or from the collating machine feeder unit towards the transfer portion with there being an incline interdependency between the involved units.

As far as the book channel of the transport device is concerned, the incline of the channel can be adjusted. The incline is typically up to 30°, so that the book block product can be optimally transported in the channel. In this connection, it has to be considered, however, that the loose partial book blocks, whether they proceed via the book channel or the sheet pile feed tables, have low coefficients of static friction and may easily become unstable and slip off one another. For this reason, the sheet pile feed table is intended to have an incline of no more than 10°. This then requires that, during loading operation (see iii) above), the sheet pile feed table be operated as close as possible to the book channel, and therefore an incline of 10° is preferably also intended to be provided for the latter at least.

The dynamic of the piling process, i.e. of the cycle synchronization, is based on an incline interdependency between the two units, book channel/sheet pile feed table, such that the sheet pile table has a series of band-conveyors that ensure cycle synchronization of the sheet piles, and such that the partial book block is transported in the channel such that the piling occurs by means of a finger chain that acts interdependently between the sheet pile feed table and the book channel, and thus maintains the conveyance of the particular product.

The invention will be described below in more detail with reference to the drawings. All the elements that are not essential to readily understand the invention have been omitted. The same elements are provided with the same reference signs in the different figures.

FIG. 1a shows the infrastructure of a transport device 100, which is formed of transfer portions and of a series of feed elements. A first transfer portion UEF-1, which is fitted with at least one sheet pile feed unit BSZ-1 and at least one first collating machine feeder unit ZTM-1, is positioned at the start of the transport device 100. In this connection, it is pointed out that the partial book blocks are first piled horizontally one above the other, irrespective of the plane from which this feed takes place. These horizontally piled partial book blocks are also conveyed in this state along the transport device 100 in the book channel 200 thereof, and only in a final phase is the position of the partial book blocks adjusted to suit the requirements of a downstream processing machine BM; these book block products are therefore preferably transferred from a horizontal state to a vertical position upstream of the processing machine BM.

A first separating element TE-1 (also referred to as a handover element), which is arranged upstream of a second transfer portion UEF-2, operates downstream of the first transfer portion UEF-1, a second sheet pile feed unit BSZ-2 preferably being arranged at the start of the second transfer portion UEF-2. The second transfer portion UEF-2 is expanded to include a transition portion ULS (not shown in more detail) that ensures, as already mentioned, that the book block product fed thereto can be transferred from being horizontally transported to being vertically transported (on the book spine).

Accordingly, a second separating element TE-2 arranged downstream of the transition portion ULS is supplied with book block products that are already in the specified book block position for the processing steps in the processing machine BM, meaning that the final separating element TE-2 can fulfill its original task, specifically that of intervening to bring order to imponderables and malfunctions affecting the delivered book block products, so that the downstream processing machine BM can be supplied with book blocks in the correct position and in keeping with the cycle. The transition portion ULS for changing the position of the book block products must therefore be arranged upstream of the final separating element in the transport device.

FIG. 1b shows a further transport device 100 including three transfer portions UEF-1, UEF-2, UEF-3 between which a separating element TE-1, TE-2 is arranged as a link in each case. FIG. 1a and 1b also show schematically that the feed elements, in particular the sheet pile feed units BSZ-1, BSZ-2 are operatively connected to the schematically shown positions of the sheet pile feed tables BSZT, which perform a height adjustment between the partial book blocks fed from the different feed elements, and the pile of book block products already in the book channel 200.

FIG. 2 is a theoretical depiction of the structure of the first separating element TE-1, which is arranged between the first transfer portion UEF-1 and the second transfer portion UEF-2. As shown, the drives M1, M2 of the individual elements that can be seen here are autonomous; the speed profiles of the drives M1, M2 that operate within the transport device can be coordinated by the system controller, if need be.

However, by means of this decoupling, the separating element TE-1 can independently fulfill the task assigned thereto, i.e. that of acting to bring order to the flow of the book block products, in order to receive a partial book block fed horizontally from the upstream transfer portion UEF-1, guide the partial book block horizontally via the conveying portion formed by the first separating element TE-1, and then horizontally hand the partial book block over to the downstream transfer portion UEF-2 in keeping with the cycle. Similar considerations also apply to the further separating element TE-2. Accordingly, the separating elements TE-1, TE-2 are equipped with at least one finger chain 501 that circulates within the separating element, which chain includes carrier fingers 501' which are vertically or virtually vertically oriented along the horizontally guided partial book blocks (FIG. 8), whereas the fingers are horizontally or virtually horizontally oriented along the vertically guided book block products.

The significance of the production direction PR1/PR2 will be described in more detail with reference to FIG. 3-7.

FIG. 3 shows a first production variant in which the final book block consists of a first partial book block BSZ-1-*a*, which is provided by the first sheet pile feed unit BSZ-1. A second partial book block ZTM-1-*a* from the collating machine feeder unit ZTM-1 is subsequently piled on the first partial book block, and a further feed BSZ-2-*a* from the second sheet pile feed unit BSZ-2 is then added to form a final book block, before onward travel in the production direction PR1 then takes place. In this case, the other elements in the book channel 200 remain unused, or they are placed out of operation.

FIG. 4 shows a second production variant in which the final book block consists of a first partial book block ZTM-1-*a*, which is provided by the first collating machine feeder unit ZM-1. A second partial book block BSZ-2-*a* from the second sheet pile feed BSZ-2 is subsequently piled on the first partial book block, before onward travel in the production direction PR1 then takes place. In this case, the other elements in the book channel 200 again remain unused, or they are placed out of operation.

FIG. 5 shows a third production variant in which the final book block consists of a first partial book block BSZ-1-*a*, which is provided by the first sheet pile feed unit BSZ-1. A second partial book block ZTM-2-*a* from a second feed device ZTM-2, which immediately follows the upstream collating machine feeder unit ZTM-1, is subsequently piled on the first partial book block. The thus formed final book block then travels onward in the production direction PR2, it being possible for the onward travel to have a different destination, i.e. not necessarily the processing machine BM, as is usually the case if the onward travel in the production direction is labeled as PR1. In this production variant, it is still possible for a partial book block BSZ-2-*a* from the second sheet pile feed unit BSZ-2 to independently travel onward in the production PR1. In this case too, the remaining elements in the book channel 200 remain unused, or they are placed out of operation.

FIG. 6 shows a fourth production variant in which the final book block consists of a first partial book block BSZ-1-*a*, which is provided by the first sheet pile feed unit BSZ-1. A second partial book block ZTM-2-*a* from a second feed device ZTM-2, which immediately follows the upstream collating machine feeder unit ZTM-1, is subsequently piled on the first partial book block. The final book block then travels onwards in the production direction PR1. In this case too, the remaining elements in the book channel 200 remain unused, or they are placed out of operation.

FIG. 7 shows a fifth production variant in which the final book block consists only of a first partial book block BSZ-2-*a*, which is provided by the second sheet pile feed unit BSZ-2 to then travel onward in the production direction PR1. In this case too, the remaining elements in the book channel 200 remain unused, or they are placed out of operation.

FIG. 8 shows the inner workings of a separating element TE-1 in operation. The partial book block BB transported by the first transfer portion UEF-1 by means of a carrier finger 500' arranged on a finger chain 500 is received in due time by the next carrier finger 501' of the separating element TE-1 and is pushed onward via the available portion in a controlled manner until the partial book block enters the domain of the following transfer portion UEF-2. Here the partial book block is then received and transported onward by the carrier fingers 502', which are associated with the transfer portion UEF-2 and are arranged on a finger chain 502.

Therefore, the carrier fingers 501' are rotatably mounted on a finger chain 501 so as to be movable in a circulation direction UF, and they thus travel virtually in parallel with the production direction PR1, in particular in the region of the partial book blocks or the book block product BB. The length of the individual carrier fingers 501' is kept >150 mm from the channel base, resulting in high peripheral speeds when pivoting. It is also intended for there to be the smallest possible spacing between the transported book blocks in the book channel 200, so that they cannot be displaced.

The second or final separating element TE-2 functions similarly, differing only in that the carrier fingers 501' (not shown again) extend horizontally, i.e. no longer vertically, as is the case for the first separating element TE-1 and as can be seen in FIG. 2. This is because, in the second or final separating element TE-2, the book block products arrive vertically oriented on the book spines and are also conveyed onward in this manner.

If need be, the carrier fingers 501' may be designed to be pivotable, so that they can be used in both the separating element TE-1 and the separating element TE-2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A separating element for operation of a transport device, which is configured to pile a plurality of partial book blocks for forming a book block along a book channel associated with the transport device, the book block being feedible to a processing machine, the separating element comprising at least one first separating element,
    wherein the book channel comprises at least one transfer portion,
    wherein the at least one first separating element is arranged within the transport device as a link between an upstream transfer portion and a downstream transfer portion,
    wherein the first separating element is configured to be operated by at least one drive and is configured to:
        receive a partial book block fed horizontally from the upstream transfer portion,
        horizontally transport the partial book block onward via a conveying portion formed by the first separating element, and
        then horizontally hand the partial book block over to the downstream transfer portion in keeping with a cycle, and
    wherein the partial book blocks to be piled are deliverable towards the transfer portion vertically and laterally in relation to a production direction in the book channel of the transport device.

2. The separating element according to claim 1, wherein the first separating element is configured to be autonomously operated or operated interdependently with the upstream transfer portion or the downstream transfer portion.

3. The separating element according to claim 1, wherein the at least one transfer portion comprises a plurality of transfer portions segments, which are successively arranged in the production direction.

4. The separating element according to claim 1, wherein the at least one transfer portion, having a conveying portion, and the at least one first separating element comprise, along the respective conveying portion thereof, an integrally continuous or segmented finger chain for transporting the partial book blocks.

5. The separating element according to claim 4, wherein the finger chain comprises carrier fingers which adopt a vertical or virtually vertical orientation along the horizontally guided partial book blocks.

6. The separating element according to claim 1, wherein the at least one transfer portion comprises a transfer portion that is arranged downstream in the production direction with respect to a final sheet pile feed unit and comprises a transition portion within which the book block fed thereto is transferable from being horizontally transported to vertically transported.

7. The separating element according to claim 1,
wherein at least one second separating element is arranged downstream of the first separating element within the transport device, and
wherein the at least one second separating element is arranged upstream of the processing machine.

8. The separating element according to claim 7, wherein the partial book blocks to be piled or the finished piled book block product are cyclically transportable via the first separating element and/or the second separating element in a monotonous, synchronous or discontinuous manner with respect to the cycle of the at least one transfer portion arranged upstream and downstream of the first separating element and the second separating element.

9. The separating element according claim 1, wherein the at least one transfer portion of the transport device that operates upstream or downstream of the at least one first separating element is fitted with at least one sheet pile feed unit and/or at least one collating machine feeder unit for feeding at least one pile-forming partial book block.

10. The separating element according to claim 1, wherein the lateral feed of a particular partial book block to be piled is controllable by control profiles such that the control profiles continually intervene, as required, to make a height adjustment to a sheet pile feed table that is operatively connected to a sheet pile feed unit, with respect to the current height of the partial book block that is positioned horizontally in the transfer portion.

11. The separating element according to claim 10, wherein three different operating modes are used for the height-adjustable sheet pile feed table that is operatively connected to the sheet pile feed unit, the operating modes including:
a) in that the sheet pile feed table is in the top position in a passage mode;
b) in that the sheet pile feed table is in the bottom position in a loading mode; and/or
c) in that the height of the sheet pile feed table is adjusted to the height of the incoming partial book block in an adding mode.

12. The separating element according to claim 1, wherein the partial book block to be piled is deliverable from a sheet pile feed unit and/or from a collating machine feeder unit to the transfer portion with there being an interdependency between the units of their respective conveyance incline.

13. The separating element according to claim 10, wherein the particular partial book block to be piled is deliverable from the sheet pile feed unit and/or from a collating machine feeder unit to the transfer portion with there being an interdependency between the units of their respective conveyance incline.

14. The separating element according to claim 1, wherein at least the horizontally transported partial book block can be conveyed within at least one of the transfer portions at an incline of up to 30°.

15. The separating element according to claim 1, wherein the transport of the partial book block along the conveying portion defined in the first separating element, which transport is controlled by the drive, is operable using different speed profiles.

16. The separating element according to claim 1, wherein the transport device is operable over at least some of the operative transfer portions, separating elements, sheet pile feed units, and collating machine feeder unit.

17. The separating element according to claim 1, wherein control profiles control the elements of the transport device in order to control an intermediate discretionary diversion of a partial book block from a transfer portion, a sheet pile feed unit, a collating machine feeder unit, a separating element.

18. A separating element for operation of a transport device, which is configured to pile a plurality of partial book blocks for forming a book block along a book channel associated with the transport device, the book block being feedible to a processing machine, the separating element comprising a first separating element and a second separating element,
wherein the book channel comprises at least one transfer portion,
wherein the second separating element is arranged within the transport device as a link between an upstream transfer portion and a downstream transfer portion,
wherein the second separating element is configured to be operated by at least one drive and is configured to:
receive a book block product fed vertically from the upstream transfer portion,
vertically transport the book block product onward via a conveying portion formed by the second separating element, and
then vertically hand the book block product over to the downstream transfer portion in keeping with a cycle,
wherein the first separating element comprises, along a conveying portion thereof for transporting the book block product, an integrally continuous or segmented finger chain, which itself comprises carrier fingers that are vertically or virtually vertically oriented for a horizontally guided book block product,
wherein the second separating element comprises, along the conveying portion thereof for transporting the book block product, an integrally continuous or segmented finger chain, which itself comprises carrier fingers that are horizontally or virtually horizontally oriented for a vertically guided book block product, and
wherein the second separating element is arranged downstream in a production direction from the first separating element.

19. A method for operating a transport device for piling a plurality of partial book blocks for forming a book block along a book channel associated with the transport device, wherein the transport device comprises:
a first transfer portion, which is operated in a manner operatively connected to a first sheet pile feed unit and a first collating machine feeder unit;

a first separating element, which is operated downstream of the first transfer portion;

a second transfer portion, which follows the first separating element and is operated in a manner operatively connected to a second sheet pile feed unit;

a second separating element, which is operated downstream of the second transfer portion; and a third transfer portion, the infrastructure of which is configured to load an adjoining processing machine, the method comprising:

receiving a partial book block fed horizontally from the first transfer portion, horizontally transporting the partial book block onward via a conveying portion formed by the first separating element, and then horizontally handing the partial book block over to the second transfer portion in keeping with a cycle, wherein the first separating element is operated to decouple a respective transportation of the book block in the first transfer portion from the second transfer portion, and the second separating element is operated to decouple the respective transportation of the book block in the second transfer portion from the third transfer portion.

20. The method according to claim 19, wherein the transport device is operated over at least some of the elements.

21. The method according to claim 19, wherein at least the second transfer portion, which is arranged upstream of the second separating element, comprises at least one transition portion that transfers the book block from a horizontal position to a vertical position.

22. The method according to claim 21, comprising the following additional steps:

receiving the book block fed vertically from the at least one transition portion of the second transfer portion, vertically transporting the book block onward via a conveying portion formed by the second separating element, and then vertically handing the book block over to the third transfer portion in keeping with the cycle.

* * * * *